US012589537B2

(12) United States Patent
Mitani

(10) Patent No.: US 12,589,537 B2
(45) Date of Patent: Mar. 31, 2026

(54) MOLD CLAMPING DEVICE AND INJECTION MOLDING MACHINE

(71) Applicant: THE JAPAN STEEL WORKS, LTD., Tokyo (JP)

(72) Inventor: Souma Mitani, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 72 days.

(21) Appl. No.: 18/348,890

(22) Filed: Jul. 7, 2023

(65) Prior Publication Data

US 2024/0009904 A1 Jan. 11, 2024

(30) Foreign Application Priority Data

Jul. 8, 2022 (JP) ................................. 2022-110737

(51) Int. Cl.
B29C 45/66 (2006.01)
B29C 33/20 (2006.01)
B29C 45/83 (2006.01)
(52) U.S. Cl.
CPC ............ B29C 45/66 (2013.01); B29C 33/202 (2013.01); B29C 2045/665 (2013.01); B29C 2045/835 (2013.01)
(58) Field of Classification Search
CPC ........ B29C 2045/66; B29C 2045/1792; B29C 2045/665; B29C 2045/835; B29C 2045/1797; B29C 33/202
See application file for complete search history.

(56) References Cited

U.S. PATENT DOCUMENTS

| | | | | |
|---|---|---|---|---|
| 6,561,785 B1 * | 5/2003 | Morita | .................... | B29C 45/66 |
| | | | | 425/150 |
| 2018/0147764 A1 * | 5/2018 | Takahashi | ............ | B22D 17/263 |

FOREIGN PATENT DOCUMENTS

| | | | | | |
|---|---|---|---|---|---|
| CN | 102046352 A | * | 5/2011 | ........ | B29C 45/4005 |
| EP | 2705940 A1 | * | 3/2014 | ............ | B29C 45/17 |
| JP | 05269748 A | | 10/1993 | | |
| JP | 2003011196 A | * | 1/2003 | ............ | B29C 45/83 |
| JP | 3158923 U | | 4/2010 | | |

OTHER PUBLICATIONS

Communication issued on Sep. 3, 2025 by the Japan Patent Office in the corresponding Japanese Patent Application No. 2022-110737.

* cited by examiner

*Primary Examiner* — Virak Nguon
(74) *Attorney, Agent, or Firm* — Sughrue Mion, PLLC

(57) ABSTRACT

A mold clamping device includes two mold platens; a plurality of ball screw mechanisms connecting the mold platens to each other; and a plurality of servo motors configured to drive the respective ball screw mechanisms. Each of ball screws respectively configuring the plurality of ball screw mechanisms is provided with a cover which covers at least a part of the corresponding ball screw between the two mold platens.

14 Claims, 3 Drawing Sheets

MOLD CLAMPING DEVICE AND INJECTION MOLDING MACHINE

CROSS-REFERENCE TO RELATED APPLICATIONS

This application is based on and claims priority under 35 USC 119 from Japanese Patent Application No. 2022-110737 filed on Jul. 8, 2022, the entire content of which is incorporated herein by reference.

TECHNICAL FIELD

The present disclosure relates to a mold clamping device including two mold platens and a plurality of ball screw mechanisms connecting the mold platens, and an injection molding machine.

BACKGROUND

An injection molding machine or a pressing machine is provided with a mold clamping device for clamping a mold. There are various types of mold clamping devices, and JPHS-269748A discloses a mold clamping device including two mold platens. That is, the mold platens include a fixed platen and a movable platen. The fixed platen and the movable platen are connected by four sets of ball screw mechanisms. One of the mold platens is provided with four ball nuts configuring the four sets of ball screw mechanisms, and the other of the mold platens is provided with four servo motors for rotating four ball screws. Accordingly, when the four servo motors are driven, the movable platen slides relative to the fixed platen by the four sets of ball screw mechanisms. That is, the mold is opened and closed.

SUMMARY

When the mold clamping device described in JPHS-269748A opens and closes the mold, the four ball screws inevitably rotate. Grease adheres to the ball screws, and may be scattered due to the rotation. That is, the grease may contaminate the mold and a surrounding environment.

The present disclosure provides a mold clamping device which prevents contamination of a surrounding environment by grease.

Other problems and novel features will become apparent from description of the present description and the accompanying drawings.

The present disclosure is directed to a mold clamping device including: two mold platens; a plurality of ball screw mechanisms connecting the mold platens to each other; and a plurality of servo motors configured to drive the respective ball screw mechanisms. Each of ball screws respectively configuring the plurality of ball screw mechanisms is provided with a cover that covers at least a part of the corresponding between the two mold platens.

According to the present disclosure, it becomes possible to prevent contamination of the surrounding environment by grease.

DETAILED DESCRIPTION

Figure 1:
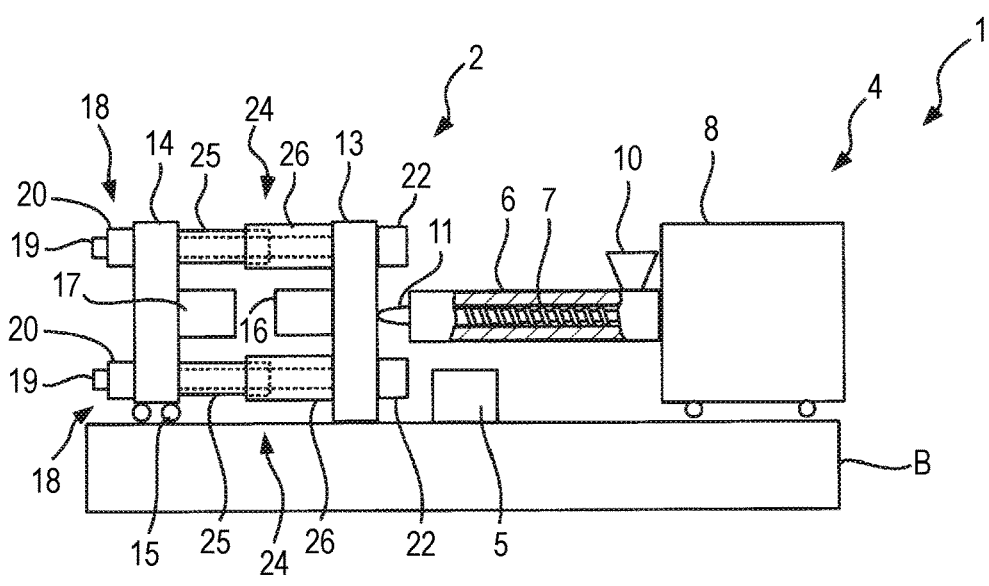
FIG. 1 is a front view showing an injection molding machine according to an illustrative embodiment.

Hereinafter, illustrative embodiments will be described in detail with reference to the drawings. The present invention is not limited to the following illustrative embodiment. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

Injection Molding Machine According to Present Illustrative Embodiment

As shown in FIG. 1, an injection molding machine 1 according to the present illustrative embodiment includes a mold clamping device 2 provided on a bed B, an injection device 4, and a control device 5 configured to control the mold clamping device 2 and the injection device 4.

Injection Device

The injection device 4 includes a heating cylinder 6, a screw 7 inserted in the heating cylinder 6, and a screw drive device 8 configured to drive the screw 7. The heating cylinder 6 is provided with a hopper 10. An injection nozzle 11 is provided at a tip end of the heating cylinder 6. When an injected material is fed from the hopper 10 and the injected material is melted by rotating the screw 7, the injected material is metered at a tip end of the screw 7. When the screw 7 is driven in an axial direction thereof, the injected material is injected.

Mold Clamping Device

Figure 2:
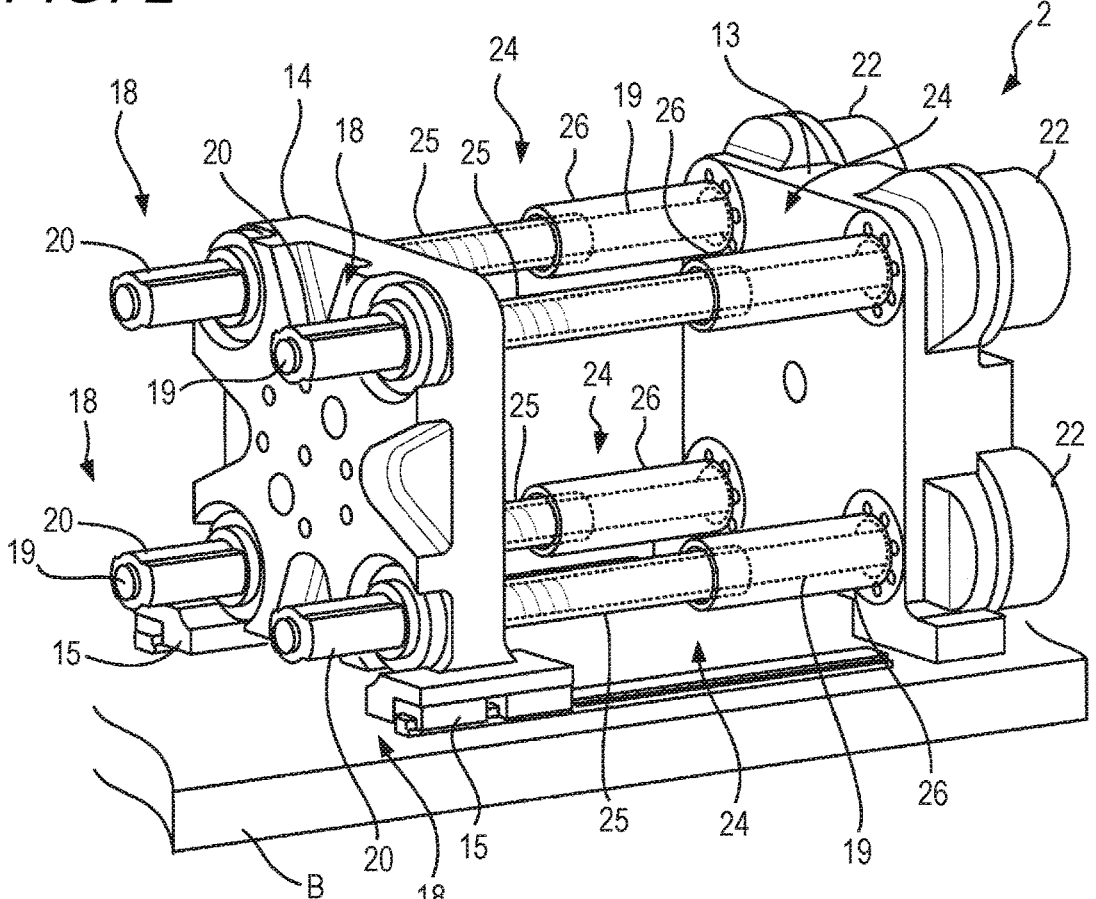
FIG. 2 is a perspective view showing a mold clamping device according to the present illustrative embodiment.

The mold clamping device 2 according to the present illustrative embodiment is a so-called two-platen mold clamping device. That is, as shown in FIG. 2, the mold clamping device 2 includes two mold platens 13, 14, that is, the fixed platen 13 and the movable platen 14. The fixed platen 13 is fixed on the bed B. The movable platen 14 is placed on linear guides 15, 15 provided on the bed B. That is, the movable platen 14 is slidable in directions approaching and separating from the fixed platen 13. As shown in FIG. 1, a fixed-side mold 16 is attached to the fixed platen 13, and a movable-side mold 17 is attached to the movable platen 14.

In the mold clamping device 2 according to the present illustrative embodiment, the two mold platens 13, 14, that is, the fixed platen 13 and the movable platen 14 are connected by four sets of ball screw mechanisms 18, 18, . . . . The ball screw mechanisms 18, 18, . . . include ball screws 19, 19, . . . and ball nuts 20, 20, . . . mesh with the ball screws 19, 19, . . . , respectively.

Although not shown in FIG. 2, through holes are formed in the movable platen 14, and the ball nuts 20, 20 . . . are fixed to the respective through holes. That is, one ends of the ball screws 19, 19, . . . are connected to the movable platen 14 via the respective ball nuts 20, 20, . . . . The other ends of the ball screws 19, 19, . . . penetrate the fixed platen 13 and are rotatably supported with respect to the fixed platen 13. The fixed platen 13 is provided with servo motors 22, 22, . . . , which are connected to the ball screws 19, 19, . . . , respectively. Therefore, when the servo motors 22, 22, . . . are driven, the ball screws 19, 19, . . . rotate and the movable platen 14 slides. That is, the molds 16, 17 (see FIG. 1) are opened and closed.

Cover

The mold clamping device 2 according to the present illustrative embodiment is characterized in that the four ball screws 19, 19 . . . are respectively provided with covers 24, 24 . . . . In the present illustrative embodiment, the covers 24, 24 . . . each include first cover bodies 25, 25 . . . and second cover bodies 26, 26 . . . . The first cover bodies 25, 25 . . . each have a cylindrical shape made of metal. Inner diameters of the first cover bodies 25, 25 . . . are slightly larger than diameters of the ball screws 19, 19 . . . . One end portions of the first cover bodies 25, 25 . . . are fixed to the movable platen 14 in a state where the ball screws 19, 19 . . . are inserted in the first cover bodies 25, 25 . . . . On the other hand, the second cover bodies 26, 26 . . . also each have a cylindrical shape made of metal, but inner diameters of the second cover bodies 26, 26 . . . are slightly larger than outer diameters of the first cover bodies 25, One end portions of the second cover bodies 26, 26 . . . are fixed to the fixed platen 13 in a state where the ball screws 19, 19 . . . are inserted in the second cover bodies 26, 26 . . . .

Figure 3A:
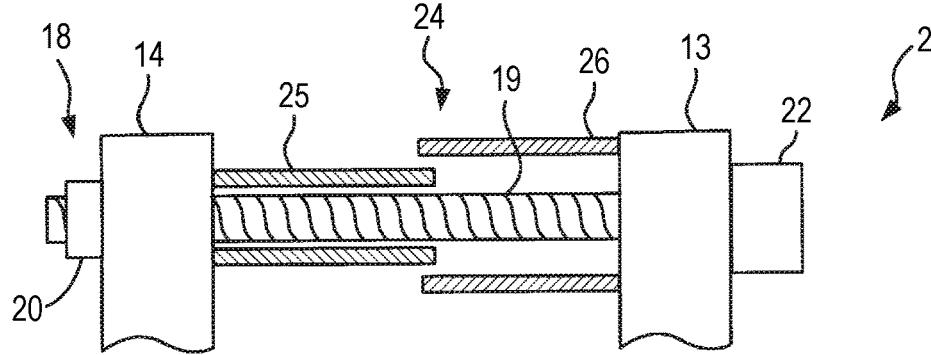
FIG. 3A is a front view showing a part of the mold clamping device according to the present illustrative embodiment.
Figure 3B:
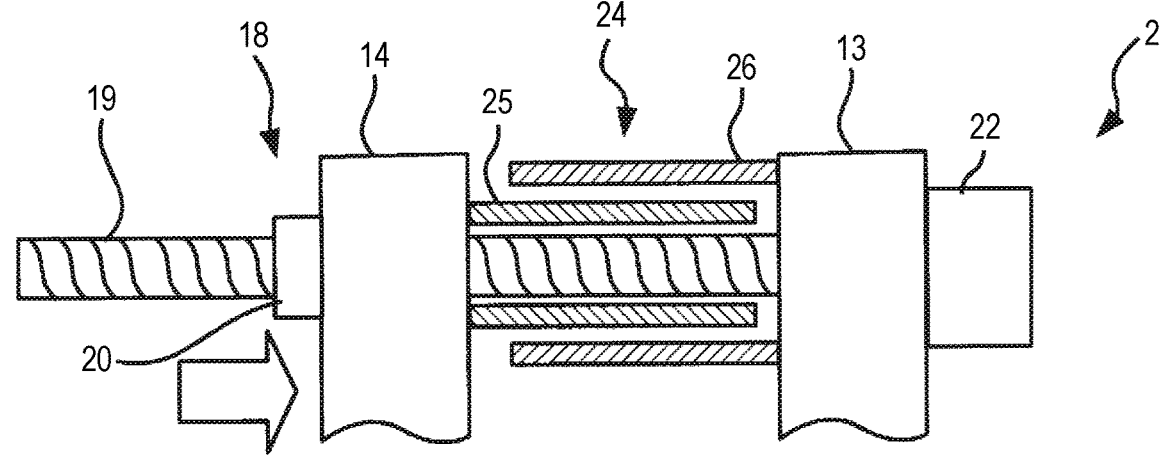
FIG. 3B is a front view showing a part of the mold clamping device according to the present illustrative embodiment.

The other end portions of the first cover bodies 25, 25 . . . are inserted inside the second cover bodies 26, 26 . . . . As shown in FIG. 3A, even when the mold clamping device 2 completely opens the molds, the ball screws 19, 19 . . . in a range between the fixed platen 13 and the movable platen 14 are completely covered. Accordingly, even if grease is scattered from the ball screws 19, 19 . . . , the grease adheres to the first cover bodies 25, 25 . . . and the second cover bodies 26, 26 . . . , thereby preventing contamination of the surrounding environment. When the mold clamping device 2 closes the molds, as shown in FIG. 3B, the first cover bodies 25, 25, . . . are deeply inserted into the second cover bodies 26, 26 . . . , but the other end portions of the first cover bodies 25, 25 . . . and the other end portions of the second cover bodies 26, 26 . . . do not come into contact with opposing mold platens 13, 14 and do not interfere with mold closing.

Modification 1

Figure 4A:
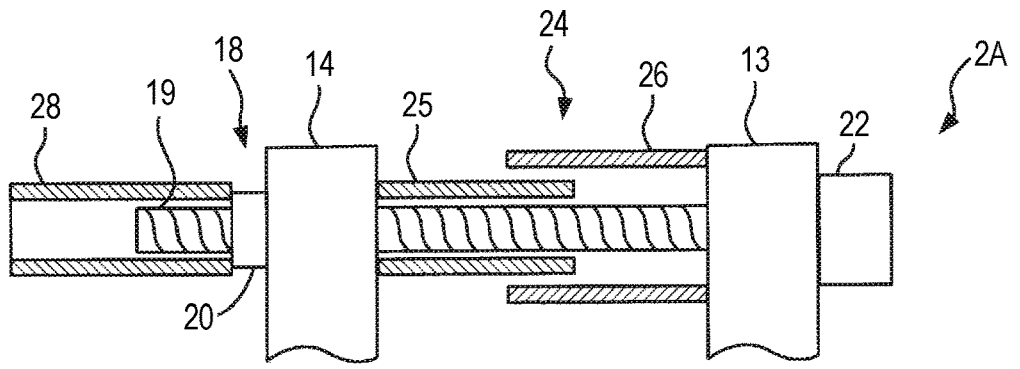
FIG. 4A is a front view showing a part of a mold clamping device according to Modification 1 of the present illustrative embodiment.

The covers 24, 24 . . . of the mold clamping device 2 according to the present illustrative embodiment can be variously modified. FIG. 4A shows a part of a mold clamping device 2A according to Modification 1. The mold clamping device 2A according to Modification 1 differs from the injection molding machine 1 and the mold clamping device 2 according to the present illustrative embodiment described with reference to FIGS. 1 and 2 only in the cover to be described below, and other configurations are the same. The same configurations will not be described.

In the mold clamping device 2A according to Modification 1, as shown in FIG. 4A, an outer cover 28 is also provided on a portion of the ball screw 19 protruding outward from the movable platen 14. The outer cover 28 also has a cylindrical shape made of metal, and an inner diameter thereof is slightly larger than the diameter of the ball screw 19. In the example shown in FIG. 4A, one end portion of the outer cover 28 is fixed to the ball nut 20, but may be fixed to the movable platen 14. Such an outer cover 28 can prevent scattering of the grease from a portion of the ball screw 19 protruding outward from the movable platen 14.

Modification 2

Figure 4B:
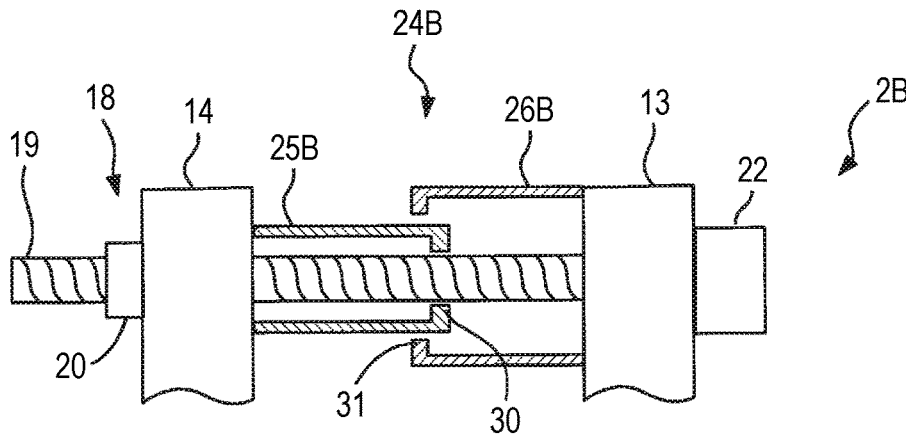
FIG. 4B is a front view showing a part of a mold clamping device according to Modification 2 of the present illustrative embodiment.

FIG. 4B shows a mold clamping device 2B according to Modification 2 of the present illustrative embodiment. The mold clamping device 2B according to Modification 2 differs from the injection molding machine 1 and the mold clamping device 2 according to the present illustrative embodiment described with reference to FIGS. 1 and 2 only in covers 24B, other configurations are the same, and thus description of the same configurations will be omitted. Weirs 30, 31 which slightly project radially inward and which are reduced in diameter are respectively formed at tip ends of a first cover body 25B and a second cover body 26B configuring the cover 24B. The weirs 30, 31 prevent the grease dropped into the first cover body 25B and the second cover body 26B from leaking out. That is, it can be said that the weirs 30, 31 serve as a grease reservoir structure.

Modification 3

Figure 4C:
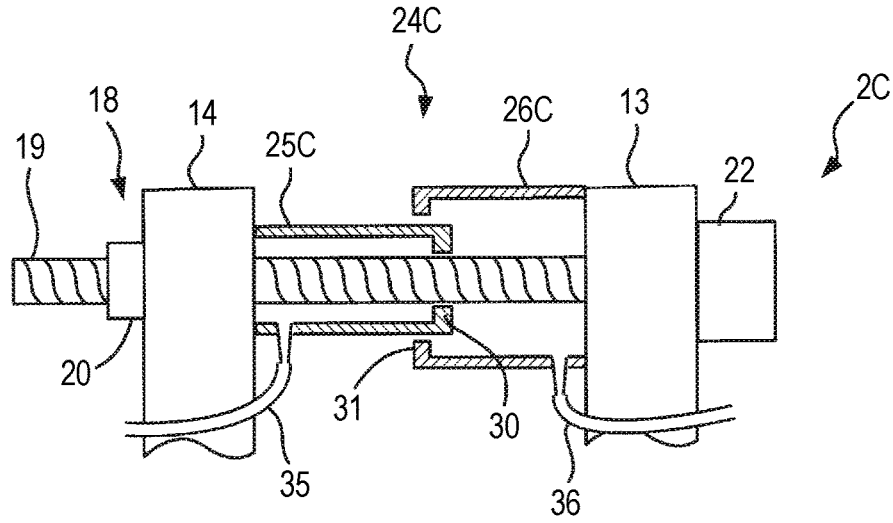
FIG. 4C is a front view showing a part of a mold clamping device according to Modification 3 of the present illustrative embodiment.

FIG. 4C shows a mold clamping device 2C according to Modification 3 of the present illustrative embodiment. The mold clamping device 2C according to Modification 3 differs from the injection molding machine 1 and the mold clamping device 2 according to the present illustrative embodiment described with reference to FIGS. 1 and 2 only in covers 24C, other configurations are the same, and thus description of the same configurations will be omitted. The cover 24C has substantially the same configuration as that of the cover 24B according to Modification 2 shown in FIG. 4B, the weirs 30, 31 are respectively formed on a first cover body 25C and a second cover body 26C. The cover 24C has a grease drain structure for discharging the grease in each of the first cover body 25C and the second cover body 26C, that is, grease discharge pipes 35, 36 are provided. The grease accumulated in the first cover body 25C and the second cover body 26C is discharged to the outside by the grease drain structure, and contamination of the surrounding environment can be prevented.

Modification 4

Figure 4D:
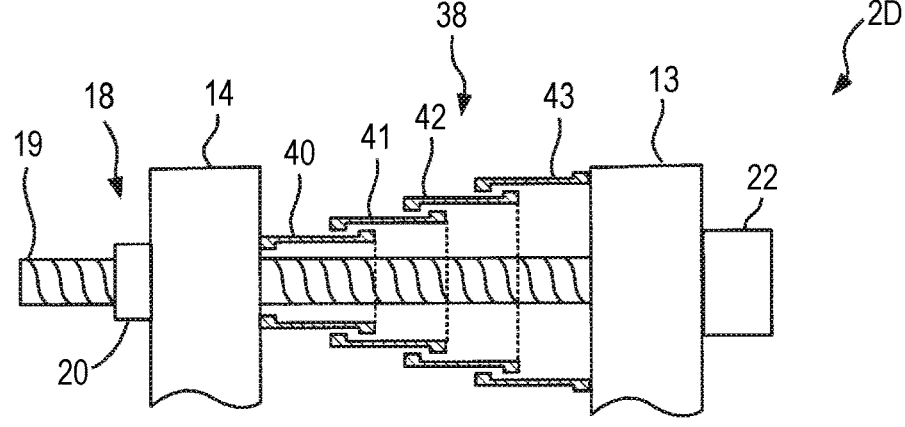
FIG. 4D is a front view showing a part of a mold clamping device according to Modification 4 of the present illustrative embodiment.

FIG. 4D shows a mold clamping device 2D according to Modification 4 of the present illustrative embodiment. The mold clamping device 2D according to Modification 4 differs from the injection molding machine 1 and the mold clamping device 2 according to the present illustrative embodiment described with reference to FIGS. 1 and 2 only in covers 38, other configurations are the same, and thus description of the same configurations will be omitted. The cover 38 provided in Modification 4 includes a plurality of cylindrical cover bodies 40, 41, 42, 43 having different diameters. For example, the cylindrical cover body 40 facing the movable platen 14 has the smallest diameter compared to other cylindrical cover bodies 41, 42, 43, and the diameters of the cylindrical cover bodies 40, 41, 42, 43 gradually increase toward the fixed platen 13. The cylindrical cover bodies 40, 41, 42, 43 can be extended and contracted as a whole and cover the ball screw 19. That is, the cylindrical cover bodies 40, 41, 42, 43 have an extendable rod-like structure. The mold clamping device 2D according to Modification 4 can also prevent scattering of the grease from the ball screw 19.

Other Modifications

The present illustrative embodiment can be variously modified. For example, in the mold clamping device 2 according to the present illustrative embodiment described with reference to FIG. 2, it has been described that the covers 24, 24 . . . completely cover the ball screws 19, 19 . . . between the two mold platens 13, 14. However, for example, only the first cover bodies 25, 25 . . . may be provided, and the second cover bodies 26, 26 . . . may be omitted. That is, the ball screws 19, 19 . . . may be exposed in the vicinity of the fixed platen 13. A relatively large amount of grease adheres to the ball screws 19, 19 . . . in the vicinity of the ball nuts 20, that is, in the vicinity of the movable platen 14. This is because scattering of the grease can be prevented to some extent only by the first cover bodies 25, 25, . . . provided on a movable platen 14 side.

Although the invention made by the present inventors is specifically described based on the illustrative embodiments, it is needless to say that the present invention is not limited to the illustrative embodiments described above, and various modifications can be made without departing from the scope of the invention. A plurality of examples described above may be implemented in combination as appropriate.

What is claimed is:

1. A mold clamping device comprising:
two mold platens;
a plurality of ball screw mechanisms connecting the mold platens to each other; and
a plurality of servo motors respectively provided on the plurality of ball screw mechanisms and configured to drive the respective ball screw mechanisms,
wherein the plurality of ball screw mechanisms respectively includes ball screws,
wherein each of the plurality of ball screws is provided with a cover that covers at least a part of the corresponding ball screw between the two mold platens,
wherein the cover provided between the two mold platens on each of the plurality of ball screws includes a first cover body provided on one of the mold platens and a second cover body provided on the other of the mold platens, and
wherein the first cover body and the second cover body are concentrically separated and maintained out of contact with each other.

2. The mold clamping device according to claim 1, wherein the cover covers the ball screw over an entire length thereof between the two mold platens.

3. The mold clamping device according to claim 1,
wherein one end portions of the plurality of ball screws protrude outward from one of the mold platens, and wherein the mold clamping device further comprises outer covers that cover the respective protruding portions of the plurality of ball screws protruded outward from the one of the mold platens.

4. The mold clamping device according to claim 1,
wherein in a case where the two mold platens are driven in a mold closing direction, the first cover body is configured to be inserted into the second cover body.

5. The mold clamping device according to claim 1, wherein the cover is made of metal.

6. The mold clamping device according to claim 1, wherein the cover is provided with a grease reservoir structure configured to receive grease scattered from the ball screw.

7. The mold clamping device according to claim 6, wherein the cover has a grease drain structure for discharging grease scattered from the ball screw to an outside.

8. An injection molding machine comprising:
an injection device configured to inject an injected material; and
a mold clamping device configured to clamp a mold, the mold clamping device comprising:
two mold platens;
a plurality of ball screw mechanisms connecting the mold platens to each other; and
a plurality of servo motors respectively provided on the plurality of ball screw mechanisms and configured to drive the respective ball screw mechanisms,
wherein the plurality of ball screw mechanisms respectively includes ball screws,
wherein each of the plurality of ball screws is provided with a cover that covers at least a part of the corresponding ball screw between the two mold platens,
wherein the cover provided between the two mold platens on each of the plurality of ball screws includes a first cover body provided on one of the mold platens and a second cover body provided on the other of the mold platens, and
wherein the first cover body and the second cover body are concentrically separated and maintained out of contact with each other.

9. The injection molding machine according to claim 8, wherein the cover covers the ball screw over an entire length thereof between the two mold platens.

10. The injection molding machine according to claim 8,
wherein one end portions of the plurality of ball screws protrude outward from one of the mold platens, and
wherein the injection molding machine further comprises outer covers that cover the respective protruding portions of the plurality of ball screws protruded outward from the one of the mold platens.

11. The injection molding machine according to claim 8,
wherein in a case where the two mold platens are driven in a mold closing direction, the first cover body is configured to be inserted into the second cover body.

12. The injection molding machine according to claim 8, wherein the cover is made of metal.

13. The injection molding machine according to claim 8, wherein the cover is provided with a grease reservoir structure configured to receive grease scattered from the ball screw.

14. The injection molding machine according to claim 13,
wherein the cover has a grease drain structure for discharging grease scattered from the ball screw to an outside.

* * * * *